United States Patent
Rasdale et al.

(10) Patent No.: US 10,922,306 B2
(45) Date of Patent: Feb. 16, 2021

(54) SYSTEMS AND METHODS FOR AUTOMATED BULK USER REGISTRATION SPANNING BOTH A CONTENT MANAGEMENT SYSTEM AND ANY SOFTWARE APPLICATIONS EMBEDDED THEREIN

(71) Applicant: AON GLOBAL OPERATIONS PLC, SINGAPORE BRANCH, Singapore (SG)

(72) Inventors: Gabriel Rasdale, Dublin (IE); Anthony Dunne, Dublin (IE)

(73) Assignee: AON GLOBAL OPERATIONS PLC, SINGAPORE BRANCH, Singapore (SG)

(*) Notice: Subject to any disclaimer, the term of this patent is extended or adjusted under 35 U.S.C. 154(b) by 362 days.

(21) Appl. No.: 15/847,245

(22) Filed: Dec. 19, 2017

(65) Prior Publication Data

US 2018/0173748 A1    Jun. 21, 2018

Related U.S. Application Data

(60) Provisional application No. 62/437,614, filed on Dec. 21, 2016.

(51) Int. Cl.
*G06F 17/00* (2019.01)
*G06F 16/23* (2019.01)
(Continued)

(52) U.S. Cl.
CPC ........ *G06F 16/2365* (2019.01); *G06F 16/951* (2019.01); *G06Q 10/101* (2013.01)

(58) Field of Classification Search
CPC .. G06F 16/2365; G06F 16/951; G06Q 10/101
See application file for complete search history.

(56) References Cited

U.S. PATENT DOCUMENTS

| 7,350,191 B1 | 3/2008 | Kompella et al. |
| 8,136,109 B1 | 3/2012 | Birdeau et al. |

(Continued)

FOREIGN PATENT DOCUMENTS

| CN | 110651252 | 1/2020 |
| CN | 110663040 | 1/2020 |

(Continued)

OTHER PUBLICATIONS

Jeff Melnick. "How to Create New Active Directory Users with PowerShell". Jun. 2018. (Year: 2018).*

(Continued)

*Primary Examiner* — Syed H Hasan
(74) *Attorney, Agent, or Firm* — Gardella Grace P.A.

(57) ABSTRACT

In an illustrative embodiment, systems and methods for bulk user setup include a bulk user registration interface presented to an end user to supply user information and a custom API handler for translating the user information into individual user setup requests recognizable by a content management system (CMS). The systems and methods may additionally include an integration engine for supplying user setup requests to one or more third-party systems integrated with the CMS within a data analytics ecosystem, such as a content development system. The integration engine may be implemented as a custom web part configured to interface with the custom API handler, the CMS, and one or more third-party systems.

20 Claims, 8 Drawing Sheets

(51) Int. Cl.
*G06F 16/951* (2019.01)
*G06Q 10/10* (2012.01)

(56) References Cited

U.S. PATENT DOCUMENTS

| | | | |
|---|---|---|---|
| 10,037,352 B1* | 7/2018 | Dyer | G06F 16/282 |
| 2006/0080546 A1 | 4/2006 | Brannon et al. | |
| 2009/0046846 A1* | 2/2009 | Lew | H04M 3/5233 |
| | | | 379/265.11 |
| 2009/0235349 A1 | 9/2009 | Lai et al. | |
| 2009/0328177 A1 | 12/2009 | Frey et al. | |
| 2010/0024014 A1 | 1/2010 | Kailash et al. | |
| 2013/0036178 A1* | 2/2013 | Pitt | G06Q 10/10 |
| | | | 709/206 |
| 2013/0132809 A1 | 5/2013 | Tseng et al. | |
| 2013/0179199 A1 | 7/2013 | Ziskind et al. | |
| 2014/0026194 A1 | 1/2014 | Smith | |
| 2014/0068737 A1 | 3/2014 | Micucci et al. | |
| 2014/0129457 A1* | 5/2014 | Peeler | G06Q 10/067 |
| | | | 705/317 |
| 2015/0178861 A1* | 6/2015 | Gordon | G06Q 50/08 |
| | | | 705/301 |
| 2015/0278171 A1 | 10/2015 | Lefebvre et al. | |
| 2015/0370872 A1 | 12/2015 | Raghavan et al. | |
| 2016/0065555 A1 | 3/2016 | Branden et al. | |
| 2016/0277999 A1 | 9/2016 | Graves et al. | |
| 2016/0314605 A1 | 10/2016 | Filippi et al. | |
| 2016/0349932 A1* | 12/2016 | Gorny | H04L 41/22 |
| 2017/0041296 A1 | 2/2017 | Ford et al. | |
| 2017/0279706 A1* | 9/2017 | Chen | H04L 67/20 |
| 2017/0329993 A1* | 11/2017 | Yao | H03M 7/6047 |
| 2017/0352073 A1* | 12/2017 | Musti | G06Q 30/04 |
| 2018/0060283 A1 | 3/2018 | King et al. | |
| 2018/0173390 A1 | 6/2018 | Dunne et al. | |
| 2018/0173715 A1 | 6/2018 | Dunne | |
| 2018/0322571 A1* | 11/2018 | Vea | G06Q 20/227 |

FOREIGN PATENT DOCUMENTS

| | | | | |
|---|---|---|---|---|
| CN | 110692070 | | 1/2020 | |
| EP | 2357558 | | 8/2011 | |
| EP | 3559830 | | 10/2019 | |
| EP | 3559850 | | 10/2019 | |
| EP | 3559879 | | 10/2019 | |
| WO | 2013054196 | | 4/2013 | |
| WO | 2013082654 | | 6/2013 | |
| WO | WO-2017107367 A1 * | 6/2017 | | G06F 16/00 |
| WO | 2018117967 | | 6/2018 | |
| WO | 2018117968 | | 6/2018 | |
| WO | 2018117970 | | 6/2018 | |

OTHER PUBLICATIONS

International Search Report and Written Opinion issued in International Application No. PCT/SG2017/050634 dated Mar. 2, 2018.
International Preliminary Report on Patentability issued in International Application No. PCT/SG2017/050634 dated Jun. 25, 2019.
International Search Report and Written Opinion issued in International Application No. PCT/SG2017/050636 dated Mar. 6, 2018.
International Preliminary Report on Patentability issued in International Application No. PCT/SG2017/050636 dated Jun. 25, 2019.
Andrew Beers, "Embedding Tableau in Your Portals, Websites and Applications", Jul. 18, 2013 (Jul. 18, 2013), https://web.archive.org/web/20130718005719if_/http://mkt.tableausoftware.com:80/downloads/embedding_views.pdf.
International Search Report and Written Opinion issued in International Application No. PCT/SG2017/050633 dated Mar. 6, 2018.
International Preliminary Report on Patentability issued in International Application No. PCT/SG2017/050633 dated Jun. 25, 2019.
Keshav, R et al., "Towards a taxonomy of architecture integration strategies", 3rd International Software Architecture Workshop, Nov. 1-2, 1998.

* cited by examiner

SYSTEMS AND METHODS FOR AUTOMATED BULK USER REGISTRATION SPANNING BOTH A CONTENT MANAGEMENT SYSTEM AND ANY SOFTWARE APPLICATIONS EMBEDDED THEREIN

RELATED APPLICATIONS

This application claims priority to U.S. Provisional Patent Application Ser. No. 62/437,614, entitled "Systems and Methods for Automated Bulk User Registration Spanning both a Content Management System and Any Software Applications Embedded Therein," filed Dec. 21, 2016. This application is related to the following patent applications: U.S. patent application Ser. No. 15/846,496 entitled "Content Management System Extensions," and filed Dec. 19, 2017, and to U.S. Provisional Application No. 62/437,552 entitled "Methods and Systems for Securely Embedding Dashboards into a Content Management System," and filed Dec. 21, 2016. All above identified applications are hereby incorporated by reference in their entireties.

BACKGROUND

Users joining a content management system (CMS) are generally provided with an individualized interface for establishing user roles, preferences, contact information, security settings, and other account information. When an organization becomes a member of an online platform including a CMS, the bulk intake of the employees of the organization as users of the online platform is typically handled by information technology (IT) service providers of the platform.

When an online platform provided by a CMS adds specialized application software and designs an integrated interface with the CMS, the integration can involve secure login to the software enabled by the CMS such that the user is not aware that individual software components of the platform require a separate login.

The inventors recognized a need to automate bulk intake of users to an online platform by automatically establishing user accounts in a CMS based upon provided user information. Additionally, in circumstances where individual embedded applications have unique logon requirements, the inventors recognized a need to automate bulk intake of users into the individual embedded applications as well as the CMS itself.

SUMMARY OF ILLUSTRATIVE EMBODIMENTS

A dashboard platform such as a data analytics ecosystem may be utilized by thousands or more users, with users being added on a per-entity-partner basis. In the example of an insurance transaction platform or insurance risk analysis platform, user organizations may include insurance carrier organizations, insurance broker organizations, and reinsurance organizations. A bulk user setup process and system allows new organizations to supply user information in bulk which is used to populate the content management system (CMS) as well as any other third-party integration systems, such as a content development system.

In one aspect, a system for bulk user setup includes a bulk user setup interface presented to an end user to supply user information and a custom API handler for translating the user information into individual user setup requests recognizable to the CMS. The system may additionally include an integration engine for supplying user setup requests to one or more third-party systems integrated within the data analytics ecosystem, such as the content development system. The integration engine, similar to the custom API handler, may translate the user information into individual user setup requests recognizable to each of the third-party systems. The integration engine, in a particular example, may be implemented as a custom web part configured to interface with the custom API handler, the CMS, and one or more third-party systems.

Each new user, in some embodiments, is associated with one or more roles or attributes. The roles and/or attributes can contribute to establishing a role-based access control model (RBAC) within the data analytics ecosystem. The roles and/or attributes, for example, can be used to filter information provided to the individual user. The roles and/or attributes of the CMS, however, may not directly match the roles and/or attributes available within each third-party system integrated into the data analytics ecosystem. In one aspect, the integration engine may be configured to transform user information into setup records conforming to available roles and/or attributes in each of the third-party systems integrated with the data analytics ecosystem.

Due to replicated user information across the CMS and one or more third-party systems integrated with the data analytics ecosystem, referential integrity problems could arise. In one aspect, systems and methods for performing bulk user setup within a data analytics ecosystem include mechanisms for ensuring referential integrity across the integrated systems.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
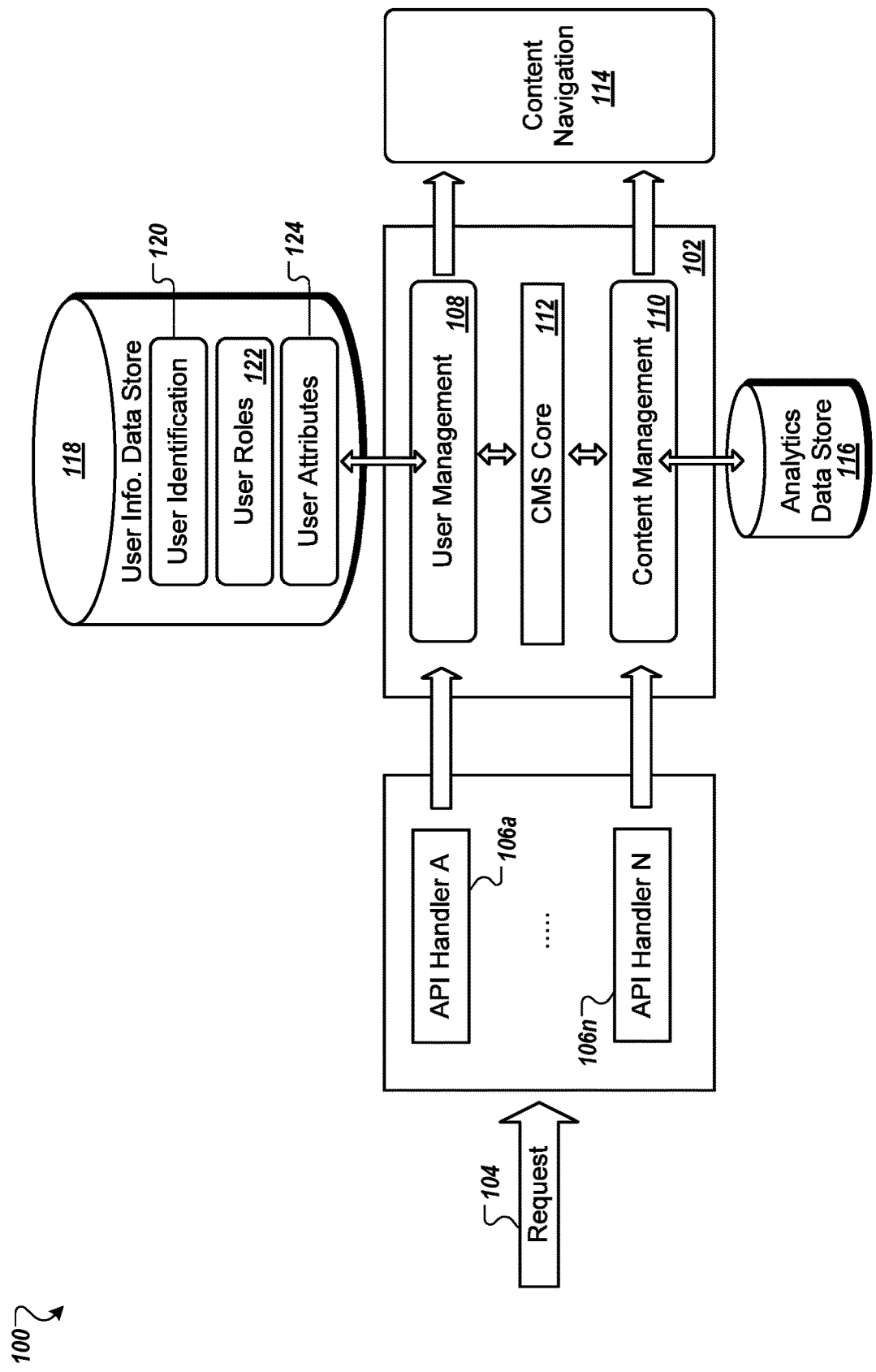
FIG. 1 is a block diagram of an example request handling operational flow.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

As illustrated in FIG. 1, in a common request handling operational flow 100 of a content management system 102, a request 104 (e.g., received through an application programming interface (API)) is forwarded via an event handler 106a-n (e.g., associated with the particular API) to an appropriate module of the CMS 102. In one example, the request 104 includes a resource identifier, such as a uniform resource locator (URL) or uniform resource identifier (URI), requesting web content. Information may be contained (e.g., embedded) in the resource identifier of the request 104. Further, the request 104 may include metadata content, such as user identification content. The externally-exposed (e.g., user driven) event handlers 106 designed to respond to web content resource identifiers supplied to the CMS 102 in the form of requests, in some examples, can include security events, document events, import/export events, control events, and/or page events.

Typically, the CMS 102 includes a user management handling module 108 configured to manage user information and a content management handling module 110 for identifying and packaging web content for delivery to the user. The user management handling module 108 and the content management handling module 110 are each in communication with a CMS core 112 and a content navigation module 114. The content navigation module 114, for example, packages the resultant information provided through the user management module 108 and the content management module 110 for review by the user (e.g., the user submitting the request 104). In a particular example, the content navigation module 114 may manage content navigation state (e.g., through a web content tree or other navigational construct for managing the navigation path of the user). In another example, the content navigation module 114 may manage loading of data into requested web content from an analytics data store 116.

In operation, the user management module 108 may perform both user authentication operations and user permissions (or restrictions) operations to deliver appropriate content based upon a particular user. The user authentication and user permissions may be based upon information maintained in a user information data store 118. For example, the user information data store 118 may maintain user identification information 120 (e.g., user name, user password, etc.). Additionally, the user identification information store 118 may collect information relevant to user permissions, such as user roles 122 and/or user attributes 124.

In authenticating a user, in a general sense, the CMS 102 may authenticate the user across all trusted domains within the content management system 102 and any third-party integrations. For example, the user management module 108 may authenticate the user with the CMS 102 itself, as well as one or more cloud-based data sources, widget providers, and other trusted CMS partner tools. In this manner, the user logs in once and has seamless access to tools which are enabled for centralized user administration under the CMS user management module 108.

Upon authentication of the user, the user management module 108 may manage user permissions for accessing content provided by the content management module 110. The content available to a particular user, for example, may be based upon the user information itself (e.g., stored as user identification information 120 in the user information data store 118), or a combination of information (e.g., user organization, user role within an organization, user role within the CMS, user permissions established in the CMS, etc.). In a particular example, a given user may be associated with a role having a membership of a number of team members, as well as permissions associated with the user's given role. Further, the basic user interface may be customized for a particular role such that portions of the interface are activated for members sharing the particular role, while other portions of the interface are deactivated. The portions of the user interface exposed and/or denied to the user's role, for example, may be selected on a module basis (e.g., enabling/disabling the visualization of individual dialogs forming a dashboard interface). In a further example, dynamic interactive applications developed for presentation within a given dashboard may be selectively enabled/disabled based upon a user's role.

The content management module 110 may then provide content for display via the content navigation module 114 based upon the user permissions identified by the user management module 108. The content management module 110, for example, may control selection and provision of web content (e.g., web parts, widgets, layout templates, etc.) for review by a user, access to multimedia content, and translation of multilingual content. Further, the content management module 110 may obtain analytics data from the analytics data store 116 to populate the web parts, widgets, and layout templates with analytics information. The selection, provision, and/or translation, for example, may be based upon the user permissions extracted by the user management module 108.

In registering a new user and activating the new user account within the CMS 102, the CMS 102 may present the user with a registration form for entering standard user information (e.g., first and last name, email address, and password). Other information that may be collected at registration, in some examples, includes username (e.g., to be used rather than email address for uniquely identifying the user), and/or demographics information such as mailing address, birth date, and gender. When collecting user information beyond the standard user information, the CMS administrator may need to extend the user class structure to add the additional user information fields.

The class structure, for example, may correspond to the information stored within the user information database 118. For example, the class structure may include an attributes mapping, collecting contact data (e.g., address, telephone, phone number, email address, etc.). The attributes, in the example of a member of a client organization (e.g., an individual broker affiliated with a client brokerage firm) may also include organizational attributes identifying the new user's organization.

The class structure, in some embodiments, also includes user roles 122. In the example of an organization, different members of the organization can perform different roles in the analytics ecosystem and thus have access to varying levels of information. In other words, selection of roles allows the CMS 102 to function on a role-based access control model (RBAC). The CEO of a client organization, for example, may be provided access to detailed information not provided to individual affiliates. The roles defined within the CMS 102, for example, may define a user's permissions for accessing particular web content.

As described above, the standard CMS configuration allows for individual user account setup. However, the analytics ecosystem may support tens of thousands of users, and the users may join the platform on an organization by organization basis, such that hundreds if not thousands of new accounts need to be established at once when introducing a new client to the analytics ecosystem. To enable batch upload of users by a new client (e.g., the client's administrator representative), the inventors created a custom batch upload tool, designed to integrate with the CMS 102 and automate the previously manual entry process. The batch upload tool, for example, may allow the administrative representative to identify multiple users grouped into multiple roles, where the user definitions are automatically populated within the CMS 102 via a custom application programming interface (API).

Figure 2A:
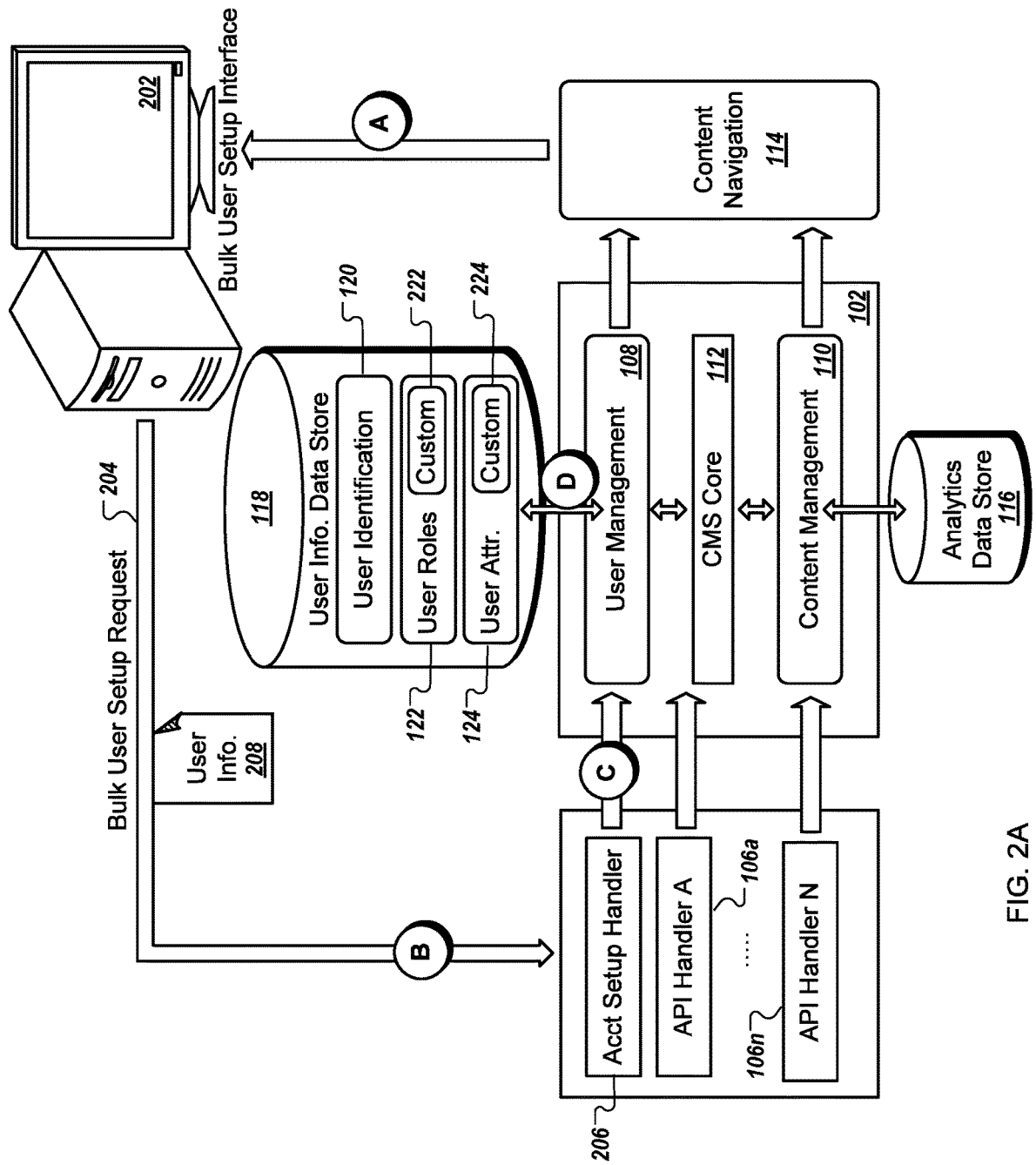
FIG. 2A is a block diagram of an example operational flow for managing bulk user setup in a content management system via a custom account setup handler.

As illustrated in FIG. 2A, an operational flow 200 for bulk upload of users belonging to a new client organization may begin at step A with the content management module 110 of the CMS 102 providing a bulk user setup interface 202 for review by the organization's administrative representative. The bulk user setup interface 202, for example, may be implemented as a single control pane (e.g., dynamic interactive web content visualization) for bulk creation of new user accounts. The bulk user setup interface 202, for example, may be designed to accept information regarding a number of users, mapping each user to a particular role within the organization.

On the back end, the dynamic interactive web content supplied to the user system may be configured to map the data inserted via the bulk user setup interface 202 into a human or machine-readable file where the individual data fields captured through the user interface are mapped to user identification, user role, and user attribute fields for storing to the CMS 102. In a particular example, the dynamic interactive web content may process the input as a user input stream and map the received values into a user information file. The user information, in a particular example, may be collected in a comma-separated values (CSV) file format.

The information entered into the bulk user setup interface 202, for example, can be issued from the client organization administrative computing system as user information 208 submitted with a bulk user setup request 204 at step B. The user information 208 may be supplied in one or more files (e.g., one file per role or one file for users of all roles).

Alternatively, the bulk user setup interface 202 may supply a file upload option for uploading a spreadsheet of new user information, such as an Excel spreadsheet, which is transferred to the CMS 102 as user information 208 via the bulk user setup request 204. The spreadsheet, for example, may be a populated version of a template made available to the administrative representative via the bulk user setup interface 202. For example, the administrative representative, rather than entering user information in real time at the bulk user setup interface 202, may instead download a spreadsheet template for population and later upload to the CMS 102. Whether the user information is supplied in real-time or in a later uploaded spreadsheet, the user information 208 may include flags or tags, such as column position, for mapping the new user information to user identification 120, user attributes 124, and/or user roles 122 within the user information data store 118 of the CMS 102.

Figure 3:
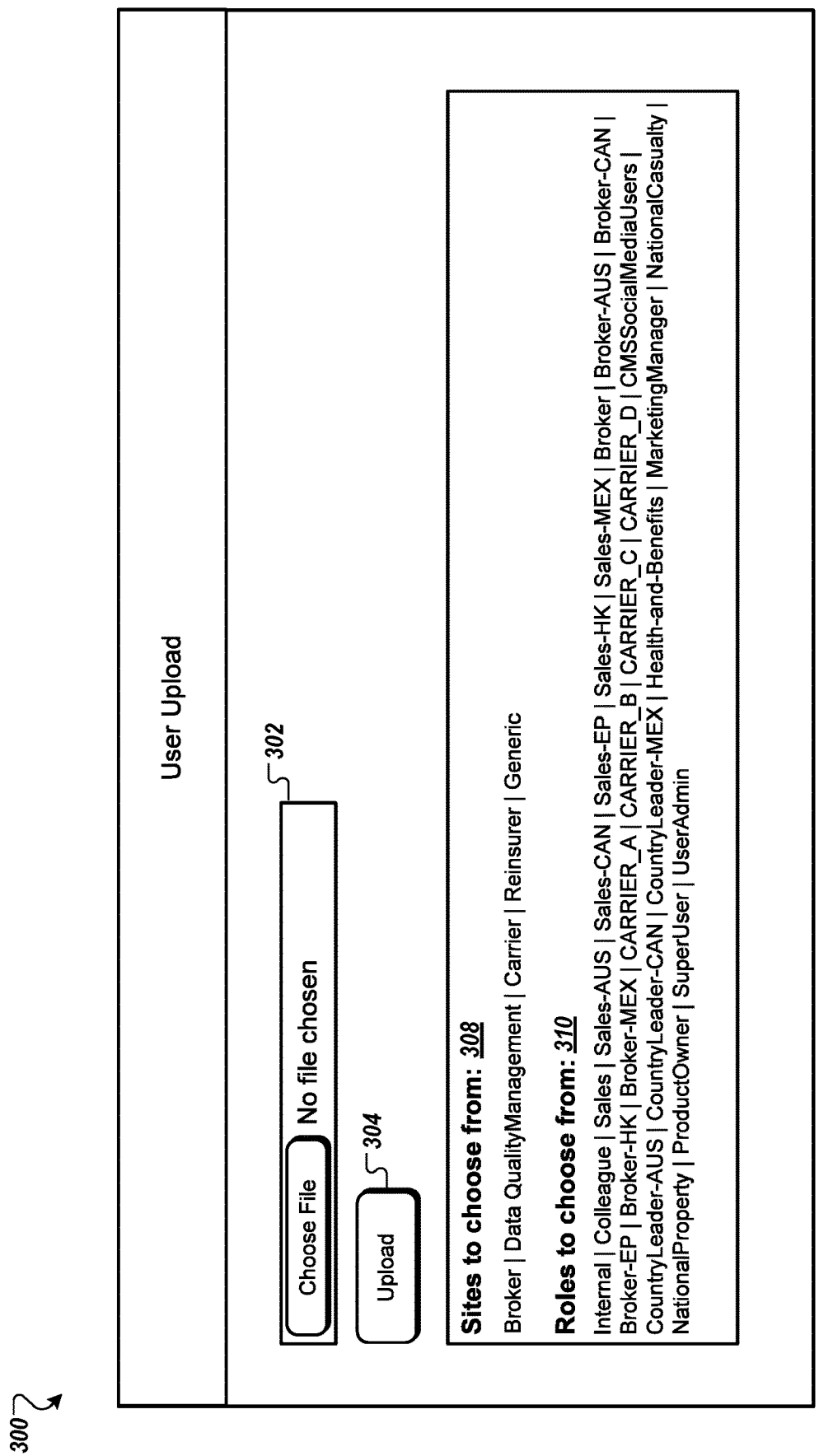
FIG. 3 is a screen shot of an example user interface for providing bulk user registration data.

Turning to FIG. 3, an example screen shot illustrates a bulk user upload interface 300 for selecting and submitting user information pre-formatted within a file. The bulk user upload interface 300 includes a file selection entry field 302 for selecting a user information file, and an upload control 304 for submitting the selected file for bulk user registration processing. The file, in some examples, can include an electronic spreadsheet such as a Microsoft Excel document, a text document such as a CSV file, or another electronic file format designating user information fields defining user information (e.g., name, etc.), user role(s) and user attribute(s) for each member of the organization included in the bulk upload.

Returning to FIG. 2, in some implementations, the bulk user setup request 208 is received, at the CMS 102, by a custom bulk account setup handler 206. The standard set of CMS handlers 106a-n (discussed in relation to FIG. 1) can be extended to include the custom bulk account setup handler 206, for example through modification or extension of a preexisting handler 106 developed for interfacing with the CMS 102.

Custom handlers, in general, may be attached to particular events (e.g., type of request entering the CMS system). Where a custom handler wraps the original functionality of a standard CMS handler, for example to add to the core process provided by the original CMS handler, the custom handler can be referred to as a handler wrapper. The custom handler wrapper, for example, may include the ability to share variables (e.g., pass in and out) with the original CMS handler.

Once a custom handler is developed, the handler can be registered to perform custom actions based upon events and/or API calls into or within the CMS. Registration of the custom handler, for example, may involve adding the custom handler to the initialization of the application (e.g., loading of the module designed to work with the custom handler). For example, the custom bulk user setup request handler may be registered through adding the custom bulk user setup request handler to the initialization process of the user management module.

The custom bulk account setup handler 206 may validate inputs within the user information to confirm appropriate data types are provided and static choices are appropriately populated. If a portion of the user information is missing or inconsistent, the custom bulk account setup handler 206 may issue a notification back to the user system (via GUI 202) regarding an identified error within the input. Conversely, the bulk user setup interface 292 may include validation mechanisms such that the custom bulk account setup handler 206 trusts the user information 208 supplied from the user system.

In some examples, turning to FIG. 3, the user interface 300 designates a set of valid sites 308 that users may be associated with, as well as valid roles 310 which may be assigned to each user. In some examples, particular roles may only be relevant to particular sites. For example, the role "Broker" may not be relevant for the Carrier site. Additionally, based upon the type of user (e.g., carrier organization, platform internal, broker organization, etc.) only a portion of a total set of available sites may be presented in the set of valid sites 308. For example, a platform internal user may be presented the valid sites 308 and valid roles 310 illustrated in FIG. 3, since an internal (e.g., administrator or developer) user may have reason to need visibility to each of the possible sites available within the platform.

The user interface 202 and/or the custom bulk account setup handler 206, in some implementations, validates the user information 208 to ensure, in some examples, that designated roles exist in the system, that designated sites exist in the system, that designated roles are associated with appropriate sites, and/or that designated roles for a particular user are not redundant (e.g., a SuperUser role may have all visibility and capabilities of a UserAdmin role). Additionally, the user interface 202 and/or the custom bulk account setup handler 206, in some embodiments, flags any redundant users. In some embodiments, where multiple users are added in multiple submissions during a login session, a session identifier of the entering user is validated for continued interfacing with the custom bulk account setup handler 206. For example, an administrator may submit users by role, division, geographic office location, or other grouping of members of a particular organization.

In some implementations, the custom bulk account setup handler 206, at step C, interfaces with the user management module 108 to supply the user setup details forwarded in the user information 208. For example, the custom bulk account setup handler 206 may be configured to iteratively feed setup information to the user management module 108 as though it is being individually entered at a user interface. The custom bulk account setup handler 206 may further be configured to enforce the RBAC model for information access within the CMS 102. For example, one or more new attributes designed to identify a new user's role within the organization (e.g., human resources, executive, broker, etc.) may be used to map to a CMS role 122 or to confirm the proper selection of the user role by the client administrative representative.

In some embodiments, the roles 122 and/or attributes 124 are extended to include custom user role aspects 222 and/or custom user attribute aspects 224. For example, the custom user attribute aspects 224 may identify geographic region (e.g., broker in Europe vs. broker in USA), organization identifier (e.g., insurance agent for carrier A vs. insurance agent for carrier B), or other refinements to allow a particular organization to tailor visualization outputs to targeted groups of employees. Custom role aspects, in some examples, can be allocated to allow for introduction of new features to certain members who would otherwise share a same role. This can include, in some examples, providing access to a first wave of users to a beta site, or launching microsites dedicated for limited or specialized use.

At step D, in some implementations, the user management module 108 commits the new user information to the user information data store 118. The information, for example, may be made available for use by the CMS 102 as well as additional partnered software applications within the data analytics ecosystem.

The data analytics ecosystem may include separate software installations beyond the CMS 102 which are capable of interoperating with the CMS 102. A portion of these software installations may be designed to cooperate with the CMS 102, such that user additions to the CMS 102 are applicable to the cooperating software installations (e.g., partnered software tools) as well.

However, some software installations within the data analytics ecosystem may not have a partnered interface with the CMS 102 such that user configurations are automatically applied across the cooperative installations. In these circumstances, an IT representative might have to manually add new users to the additional software installations to ensure cross-functionality. The IT representative would also have the responsibility to ensure that the RBAC model is applied consistently between the CMS 102 and the additional software installation to ensure a consistent user experience.

Figure 2B:
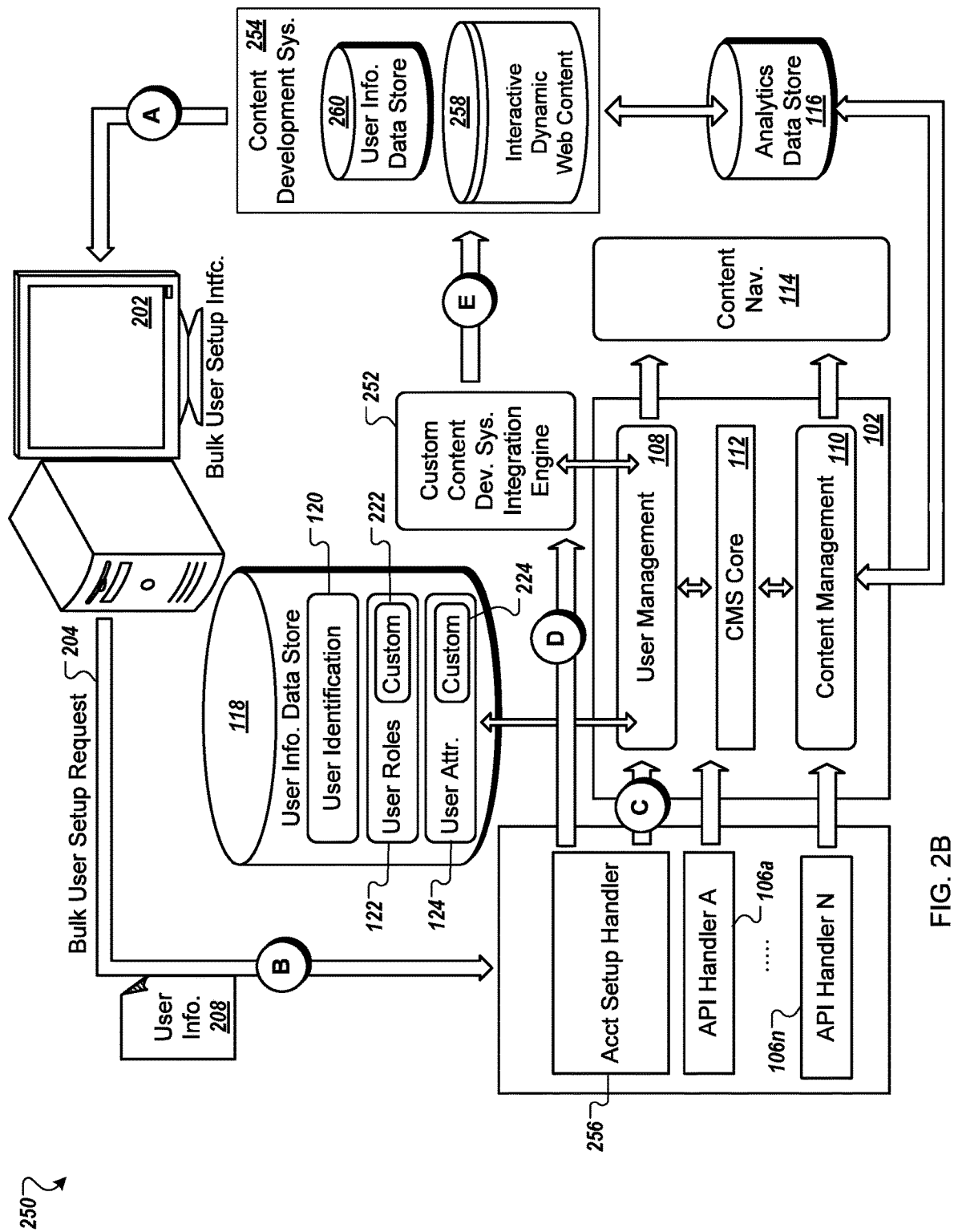
FIGS. 2B and 2C are block diagrams of example operational flows for managing bulk user setup in a content management system as well as complementary systems having individual user setup parameters via a custom account setup handler and an integration engine.

Turning to FIG. 2B, to automate bulk user updates across multiple software installations within the data analytics ecosystem, in some implementations, an account setup handler 256 includes an API for interfacing with an integration engine 252, copying user information 208 across additional software installations such as a content development system 254.

As discussed in greater detail in relation to U.S. patent application Ser. No. 15/846,496 entitled "Content Management System Extensions," and filed Dec. 19, 2017, the content development system 254 may be a server-based system or cloud-hosted system for developing and deploying analytics content for dashboard interfaces. The content development system 254, for example, may interface with the analytics data store 116 to pull real time generated content into the graphical user interface 202 for presentation to the end user. The content development system 254 may provide tools for integrating data sources, calculations, metadata, and data field information with coded web parts to generate real time dynamic interactive content 258. These tools may extend the capabilities of the CMS 102 through bypassing, at least in part, the functionality of the content management module 110, providing the dynamic interactive web content 258 directly to CMS users through customized API interfaces developed to interface the content development system 254 with the CMS 102. The separate content development system path and user information data store 260 are described in greater detail in U.S. Provisional Application No. 62/437,552 entitled "Methods and Systems for Securely Embedding Dashboards into a Content Management System" and filed Dec. 21, 2016.

As illustrated in step A of an operational flow 250 of FIG. 2B, in some implementations the content development system 254, rather than the content management module 110 of the CMS 102, provides the bulk user setup interface 202 to the client system for entering setup information for a large number of new users. Step B, representing the transmission 204 of user information 208 from the client computing system to the CMS 102, would function as described in relation to FIG. 2A. However, in some implementations the account setup handler 256 is interoperable with both the user management module 108 (illustrated in step C and functioning as described above in relation to step C of FIG. 2A) and the custom content development integration engine 252 (step D) for sharing the user setup information 208 with the content development system 254.

As illustrated in step D, the custom content development integration engine 252, in some implementations, receives user information 208 from the account setup handler 256. The custom content development integration engine 252, for example, may be a custom web part or translation widget for accepting user setup information 208 from the account setup handler 256 and supplying the user setup information 208 to the content development system 254. The custom content development integration engine 252, for example, may translate the user setup information 208 into a format appropriate for the content development system 254. In one example, the custom content development integration engine 252 may identify the information fields within the user setup information 208 appropriate to user management within the content development system 254. Further to this example, the content development system 254 may only maintain a portion of the user information 208. For example, the content development system 254, rather than storing user attributes, may simply store user login information and user roles. Additionally, the form of the role settings may differ between the CMS 102 and the content development system 254. In this circumstance, the content development integration engine 252 may map each CMS role 122/222 relevant to the content management system 102 to a corresponding role definition in the content development system 254 to ensure proper provision of analytics data and interactive dynamic web content by the content development system 254 to individual users based upon their role within the analytics ecosystem.

At step D, in some embodiments, the account setup handler 256 supplies user information 208 to the custom content development integration engine 252 iteratively, and the custom content development integration engine 252 is designed to handle individual user setup requests from the account setup handler 256 as though these account setup requests were supplied directly from a traditional user setup request handler (e.g., one of the API Handlers 106-*n* discussed in relation to FIG. 1). In other embodiments, the custom content development integration engine 252 receives the user information 208 (e.g., CSV file or other bulk information format) from the account setup handler 256 and translates the user information 208 into individual user setup commands appropriate to the content development system 254.

At step E, in some implementations, the custom content development integration engine 252 populates user account information in the user information data store 260 of the content development system 254. The custom content development integration engine 252, for example, may include an API interface with the content development system 254 for supplying new user information. In another example, the custom content development integration engine 252 may store information directly to a user information region of a data store accessed by the content development system 254, such that the content development system 254 accesses and acknowledges new information stored within the user information data store. The user information data store, for example, may be shared with the CMS 102 and/or with other third-party tools within the analytics ecosystem.

Figure 2C:
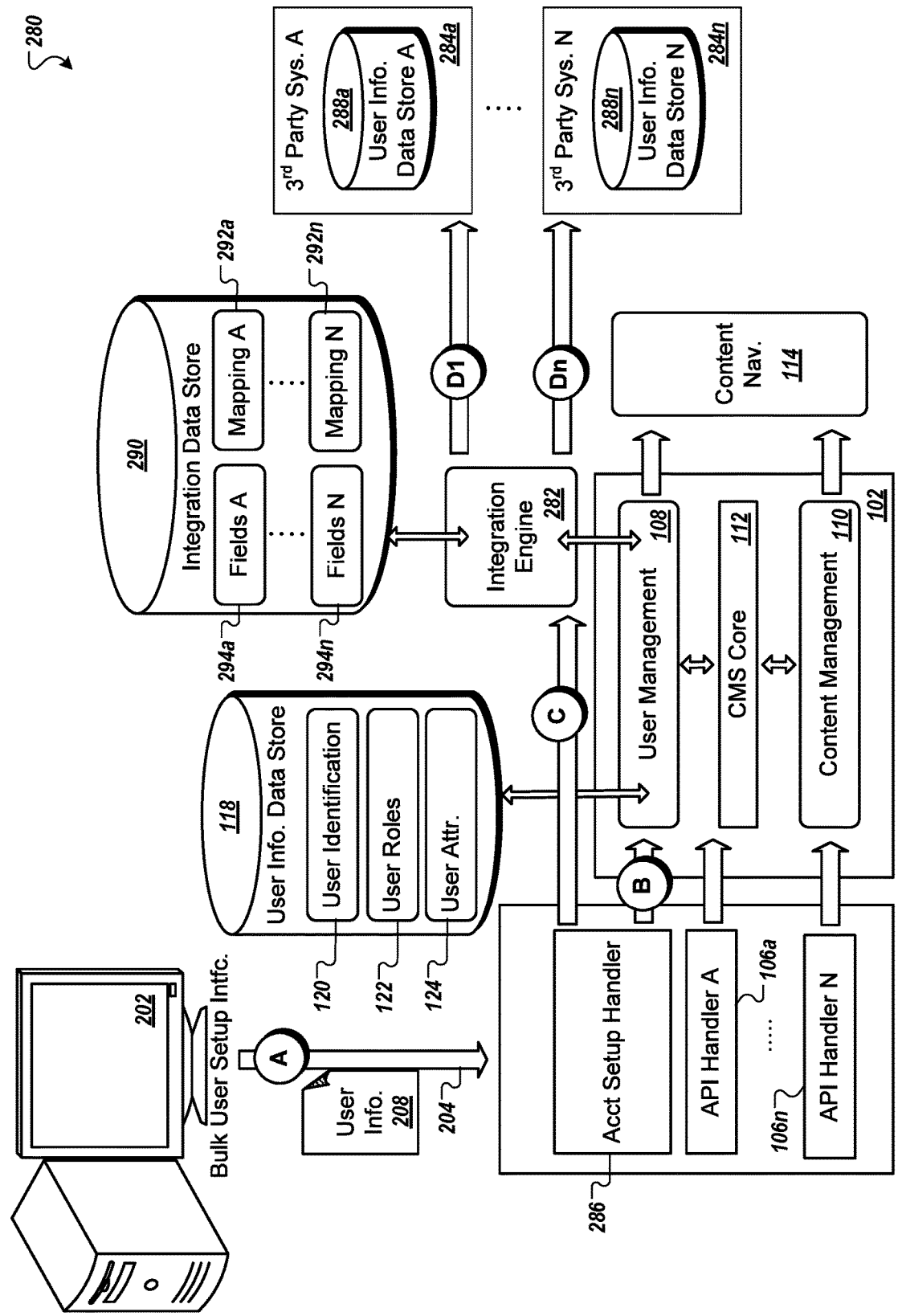

Although described in relation to FIG. 2B as an integration engine for interfacing with the content development system 254, a more general integration engine 282 is provided, in some embodiments, as a custom web component designed to interface with a number of third-party software systems 284 lacking partnered integration with the CMS 102, as illustrated in FIG. 2C. Turning to FIG. 2C, for example, the integration engine 282 may be developed to access the user information 208 via an account setup handler 286 and supply, to each third-party software system, individual user setup requests for each user record within the user information 208.

An operational flow 280 illustrated in FIG. 2C begins with receiving the user information 208 from the bulk user setup interface 202 at the account setup handler 286 via the bulk setup request 204. The bulk user setup interface 202 may be supplied by the content navigation system 114 as described in relation to FIG. 2A or through a third-party web content provisioning system such as the content development system 254 described in relation to FIG. 2B.

In some implementations, as described in relation to steps C and D of FIG. 2B, the account setup handler 286 provides the user information 208 to both the user management module 108 of the CMS 102 and the integration engine 282.

The integration engine 282, in some implementations, transforms the user information 208, for each third-party system 284, into a format applicable to the respective third-party system 284. In one example, the integration engine 282 may map each CMS role 122 and/or attribute 124 to roles and/or attributes relevant to the respective third-party system 284. For example, the integration engine 282 may access user mapping definitions 292*a*-*n* applicable to each third-party system 284*a*-*n* to map the user attributes and/or roles. In another example, the integration engine 282 may identify the information fields within the user information 208 appropriate to each third-party system 284*a*-*n*. Further to this example, the integration engine 282 may access fields definitions 294*a*-*n* to map the user fields (e.g., user information plus roles and/or attributes) to information fields appropriate to each third-party system 284*a*-*n*.

Each set of user information (e.g., role information relevant to the particular third-party software systems 284*a*-*n*, mapped from the CMS-based user role information) in some implementations, is linked by the integration engine 282 using an ecosystem-wide universal user identifier (user ID) maintained within one or more data stores. The integration engine 282, for example, may copy a user ID from the user information data store 118 and apply the user ID across the third-party systems 284a-n during bulk user setup. Further, the integration engine 282 may confirm referential integrity by confirming that the same user identifier used to identify the new user in the CMS 102 is also populated in each user role information data store region for each third-party integration. For example, if the integration engine 282 found that a particular user ID allocated by the user management module 108 of the CMS 102 was already in use by one of the third-party systems 284a, the integration engine 282 may issue an error message to the bulk user setup interface 202 (e.g., via an API with the CMS 102 or the content development system 254 of FIG. 2B).

Although illustrated as a single integration engine 282 managing all bulk user setup interfacing with the third-party systems 284a-n, in other embodiments, multiple custom web components may be designed to interface with the account setup handler 256 or an interfacing web part, each designed to manage user setup with a particular third-party software system. The integration engine 282, for example, may be a main integration engine configured to supply, to each interfacing web part corresponding to each third-party system 284a-n, individual user setup requests for each user record within the user information 208. In turn, each interfacing web part corresponding to each third-party system 284a-n, may transform the user information 208 associated with the individual user record to a format appropriate to the respective third-party system 284a-n.

To add another third-party system (e.g., system 284o) to the analytics ecosystem, in some implementations, fields (e.g., 294o) and/or mapping (e.g., 292o) may be created and stored within the integration data store 290 to aid in transforming the user information 208 into a format appropriate to the new third-party system. Further, the integration engine 282 may be updated to include communication information (e.g., APIs) for communicating with the new third-party system. Alternatively, a new sub-engine may be developed to interface with the integration engine 282 and the integration data store 290 for managing the communications with the new third-party system. The integration engine 282, in this circumstance, may be updated to communicate with the new sub-engine. To populate users within the new third-party system, in some embodiments, the integration engine 282 may be directly fed user information pulled from the user information data store 118 to feed to the new third-party system.

Figure 4:
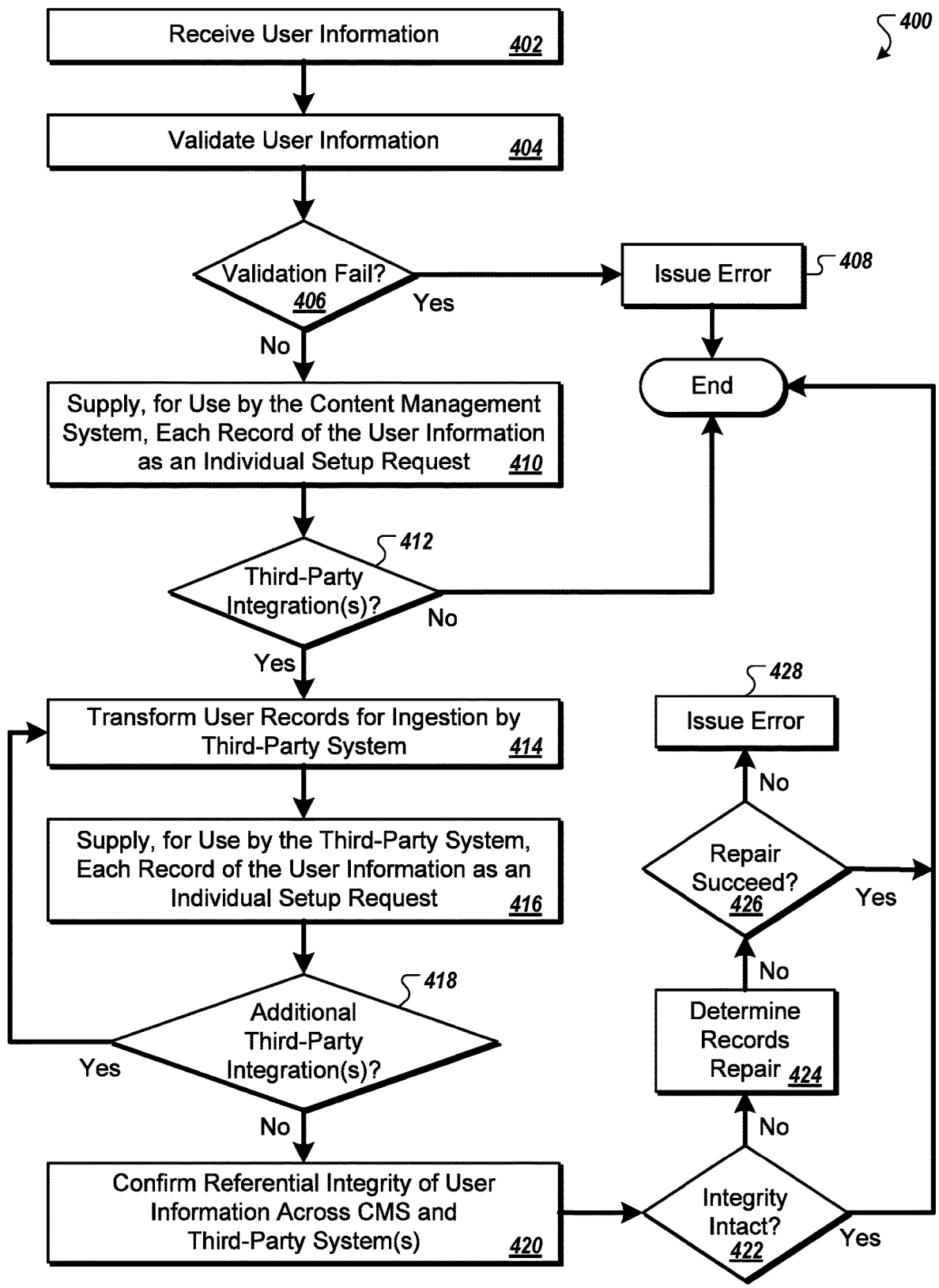
FIG. 4 is a flow chart of an example method for performing bulk user setup within a data analytics ecosystem.

FIG. 4 illustrates a flow chart of an example method 400 for performing bulk user registration within an analytics ecosystem including a content management system. Steps of the method 400, for example, may be performed by the custom setup handler 206 of FIG. 2A, the custom setup handler 256 of FIG. 2B, the custom content development system integration engine 252 of FIG. 2B, the account setup handler 286 of FIG. 2C, and/or the integration engine 282 of FIG. 2C.

In some implementations, the method 400 begins with receiving user information for bulk user intake processing (402). The user information, for example, may be entered via a graphical user interface such as the setup interface 202 of FIGS. 2A-C. In one example, the graphical user interface may include a file upload control such as the screen shot 300 of FIG. 3. The file, in some examples, can include a spreadsheet format or a value-separated text file format (e.g., CSV format). In another example, the user interface may provide the opportunity for entering new users into the system through a database transfer from a human resource repository. For example, fields included in the user information may have been selected from an employee database and exported in file format. The user information may be received by a custom API handler of a content management system, such as the handler 206 of FIG. 2A, the handler 256 of FIG. 2B, or the handler 286 of FIG. 2C.

In some implementations, the user information is validated (404). For example, the handler 206 of FIG. 2A, the handler 256 of FIG. 2B, the handler 286 of FIG. 2C, the custom content development system integration engine 252 of FIG. 2B, and/or the integration engine 282 of FIG. 2C may confirm that the records in the user information contain appropriate values, such as role designations matching valid roles 122 within the content management system and/or attribute designations matching valid attributes 124 within the content management system. In some embodiments, the user information is validated to confirm that the roles and/or attributes are valid in light of custom roles 222 and/or custom attributes 224 as described in relation to FIG. 2B. For example, the custom roles 222 and/or custom attributes 224 may be specific to the entity supplying the user information. In another example, the roles 122,222 and/or attributes 222,224 may be validated to conform with one or more selected platform sites designated for the user, such as the sites 308 described in relation to FIG. 3.

If validation fails (406), in some implementations, an error is issued (408). The error, in one example, may be relevant to a particular record, such that other records in the user information continue to be processed. In other embodiments, the method 400 may attempt to recover from the validation failure, for example by filling in appropriate missing fields with default information (e.g., a default site or a default role).

In some implementations, after successful validation, each record within the user information is supplied to the content management system as an individual setup request (410). For example, as described in relation to step C of FIG. 2A, the custom setup handler 206 may present each user record to the user management module 108 of the content management system 102 as a separate user setup request. In this manner, the individual setup requests appear to have been supplied via a standard user setup API handler, such as one of the API handlers 106a-n of FIG. 2A.

In some implementations, if one or more third-party integrations exist within the analytics ecosystem (412), the user records are transformed for ingestion by each third-party system (414). The custom content development system integration engine 252 of FIG. 2B, for example, may transform the user records in the user information 208 for compatibility with the user information data store 260 of the content development system 254. In another example, the integration engine 282 (or sub-engines in communication therewith) may transform the user information 208 into records compatible with each of the third-party systems 284a-n. In some examples, transformation can include reducing the number of fields within each record and/or mapping values of one or more fields within the user records. As illustrated in FIG. 2C, for example, the integration engine 282 may access appropriate fields 294a-n and/or mappings 292a-n for each of the third-party systems 284a-n to perform the user information mapping.

In some implementations, the user records are supplied to each third-party system as individual setup requests (416). For example, the content development system integration engine 252 of FIG. 2B or the integration engine of FIG. 2C may supply, record-by-record, the user information (e.g., transformed if applicable) to each third-party system, such as the content development system 254 and/or the third-party systems 284*a-n*. In some embodiments, transformation and supply occurs serially, record-by-record. In other embodiments, transformation is performed on the user information 208 prior to supplying user records to any third-party system 254, 284*a-n*.

Once all third-party integrations have been fed user setup information (418), in some implementations, referential integrity of the user information across the CMS and each third-party system is confirmed (420). A same user identifier, such as a number or alphanumeric code, may be used to identify a particular user across the CMS plus all third-party integrations. In this circumstance, to ensure that the user has been created successfully across the board, the referential integrity may be confirmed by looking up the user ID within the CMS and all third-party integrations. For example, the content development system integration engine 252 of FIG. 2B or the integration engine of FIG. 2C may perform referential integrity.

In some implementations, if referential integrity is not intact across the CMS and all third-party integrations (422), a repair to one or more records may be determined to assure referential integrity (424). For example, user information within the CMS may be cross-referenced with the user information of the third-party system to determine whether the third-party system has the same user. If the records cannot be repaired (426), an error may be issued (428). For example, an administrator may be messaged regarding the referential integrity error such that a correction may be applied manually. In a particular example, a referential integrity error may involve an attempt to remove a user with administrative capacity on a third-party system. In this case, the administrator may be messaged that action is required directly on the third-party system to apply the user update.

Although illustrated in a particular series of events, in other implementations, the steps of the method 400 may be performed in a different order and/or some steps may be performed in parallel. For example, in some embodiments, the user information records may be supplied to the CMS (410) and one or more third-party integrations (416) simultaneously. Further, transformation of user records and supply to third-party systems may be performed in parallel, such that third-party system 284*a* is being provided user setup requests at the same time that third-party system 284*n* is being provided with user setup requests. Additionally, in other embodiments, the method 400 may include more or fewer steps. For example, a feedback loop may be included while supplying individual setup requests to the content management system (410) and/or third-party integrations (416) to manage any failures in setup at the CMS and/or third-party system(s). Other modifications are possible while remaining within the scope and spirit of the method 400.

Figure 5:
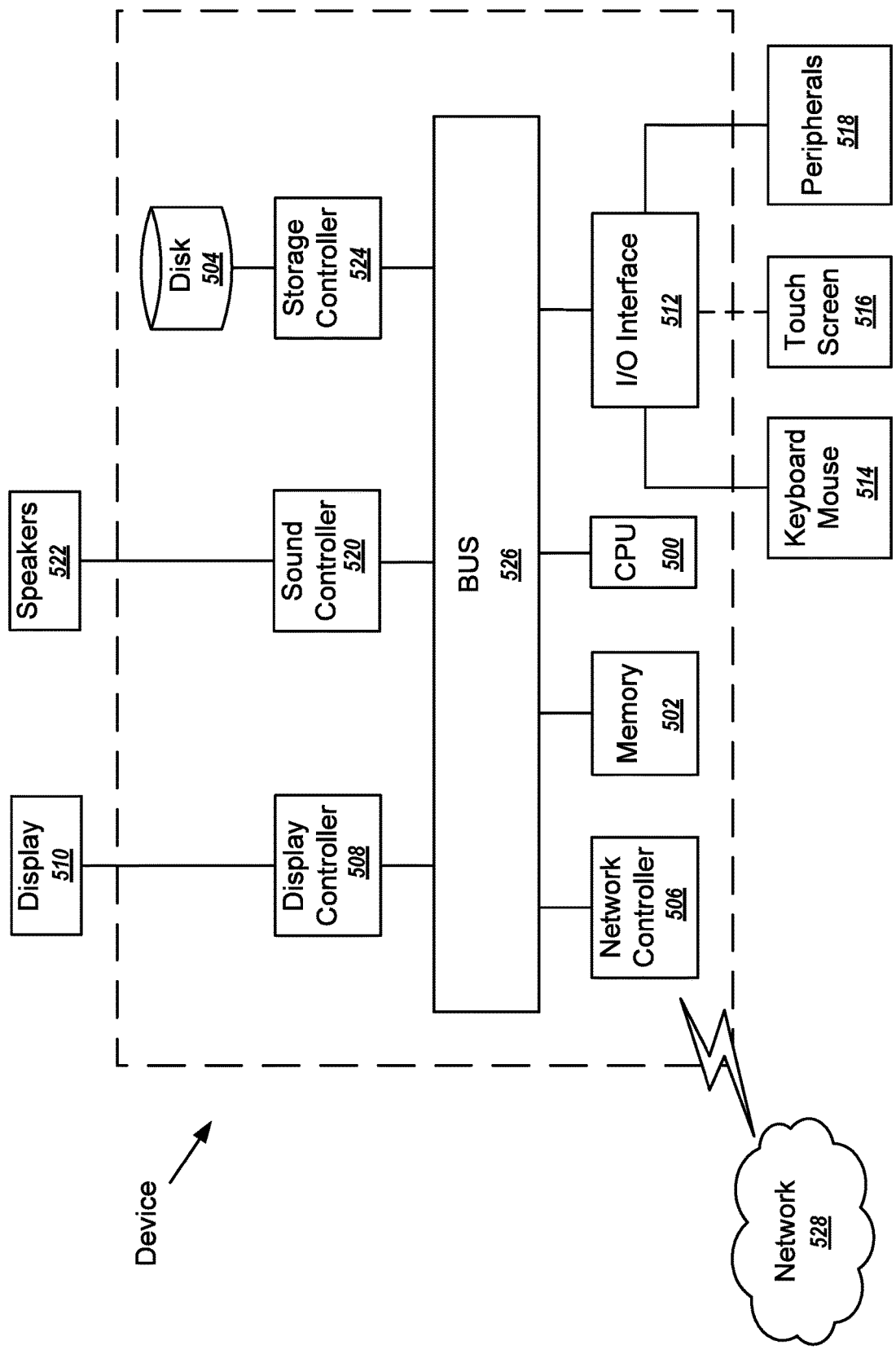
FIG. 5 is a block diagram of an example computing system.

Next, a hardware description of the computing device, mobile computing device, or server according to exemplary embodiments is described with reference to FIG. 5. In FIG. 5, the computing device, mobile computing device, or server includes a CPU 500 which performs the processes described above. The CPU, for example, may provide the processing circuitry for performing operations of the API handlers 106, CMS 102, or content navigation module 114 of FIG. 1, the account setup handler 206 or bulk user setup interface 202 of FIG. 2A, the account setup handler 256, custom content development system integration engine 252, or content development system 254 of FIG. 2B, the integration engine 282 of FIG. 2C, or the method 400 of FIG. 4. The process data and instructions may be stored in memory 502. These processes and instructions may also be stored on a storage medium disk 504 such as a hard drive (HDD) or portable storage medium or may be stored remotely. The storage medium disk 504, in some examples, may be used to store the user information data store 118 or analytics data store 116 of FIG. 1, the user information data store 260 or the interactive dynamic web content 258 of FIG. 2B, or the user information data stores 288*a-n* of FIG. 2C. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 500 and an operating system such as Microsoft Windows 5, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computing device, mobile computing device, or server in FIG. 5 also includes a network controller 506, such as an Intel Ethernet PRO network interface card from Intel Corporation of America, for interfacing with network 528. As can be appreciated, the network 528 can be a public network, such as the Internet, or a private network such as an LAN or WAN network, or any combination thereof and can also include PSTN or ISDN sub-networks. The network 528 can also be wired, such as an Ethernet network, or can be wireless such as a cellular network including EDGE, 5G and 4G wireless cellular systems. The wireless network can also be Wi-Fi, Bluetooth, or any other wireless form of communication that is known. The network 528, in some examples, may provide an interface between the user system 202 and the API handlers 106*a-n* or the account setup handler 206 of FIG. 2A, the content navigation module 114 and the user device 202 as illustrated in FIG. 1A, the custom content development system integration engine 252 and the content development system 254 of FIG. 2B, the content development system 254 and the user system 202 of FIG. 2B, the integration engine 282 and the third party systems 284*a-n* of FIG. 1C, or the user system 202 and the account setup handler 286 of FIG. 2C.

The computing device, mobile computing device, or server further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard. The display controller 508 and display 510, for example, may support presentation of the bulk user setup interface as described in relation to FIGS. 2A through 2C and as illustrated in the example user interface of FIG. 3.

A sound controller 520 is also provided in the computing device, mobile computing device, or server, such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device, mobile computing device, or server. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 6:
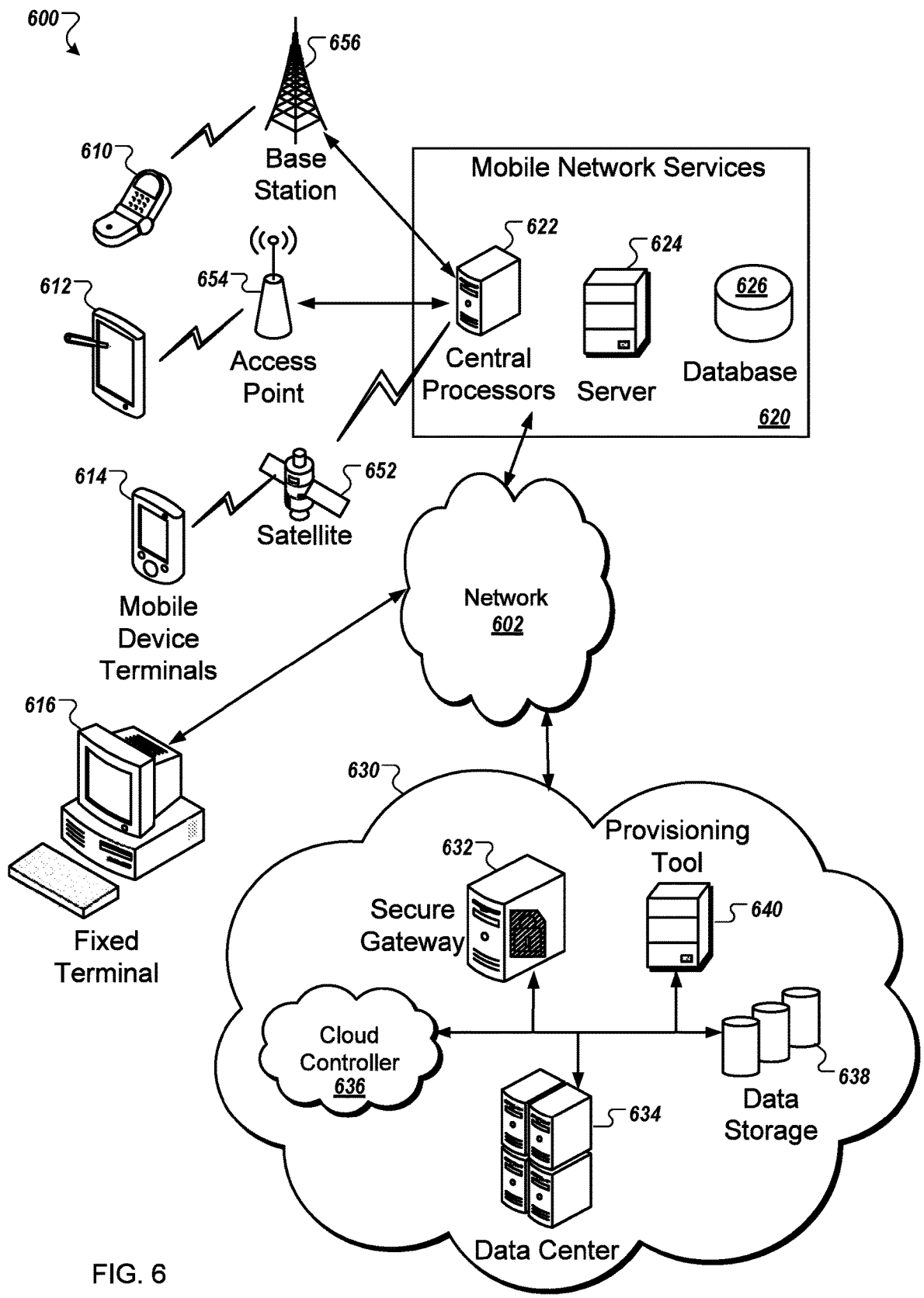
FIG. 6 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 6, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 630, such as Google Cloud Platform™ to perform at least portions of methods or algorithms detailed above. The processes associated with the methods described herein can be executed on a computation processor, such as the Google Compute Engine by data center 634. The data center 634, for example, can also include an application processor, such as the Google App Engine, that can be used as the interface with the systems described herein to receive data and output corresponding information. The cloud computing environment 630 may also include one or more databases 638 or other data storage, such as cloud storage and a query database. In some implementations, the cloud storage database 638, such as the Google Cloud Storage, may store processed and unprocessed data supplied by systems described herein.

The systems described herein may communicate with the cloud computing environment 630 through a secure gateway 632. In some implementations, the secure gateway 632 includes a database querying interface, such as the Google BigQuery platform.

The cloud computing environment 102 may include a provisioning tool 640 for resource management. The provisioning tool 640 may be connected to the computing devices of a data center 634 to facilitate the provision of computing resources of the data center 634. The provisioning tool 640 may receive a request for a computing resource via the secure gateway 632 or a cloud controller 636. The provisioning tool 640 may facilitate a connection to a particular computing device of the data center 634.

A network 602 represents one or more networks, such as the Internet, connecting the cloud environment 630 to a number of client devices such as, in some examples, a cellular telephone 610, a tablet computer 612, a mobile computing device 614, and a desktop computing device 616. The network 602 can also communicate via wireless networks using a variety of mobile network services 620 such as Wi-Fi, Bluetooth, cellular networks including EDGE, 3G and 6G wireless cellular systems, or any other wireless form of communication that is known. In some embodiments, the network 602 is agnostic to local interfaces and networks associated with the client devices to allow for integration of the local interfaces and networks configured to perform the processes described herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for supporting bulk user registration within an analytics ecosystem, comprising:
a bulk user setup interface for
presenting, to an administrator on a computing device, one or more controls for providing a user registration request, wherein providing the user registration request comprises entering, for each user of a plurality of users of the analytics ecosystem, respective user information, the user information comprising user identification information, user attribute information, and user role information, and
providing, to the analytics ecosystem via a network, the user registration request including the user information for the plurality of users,
wherein the bulk user setup interface is provided, at least in part, via a content management system; and
a bulk user setup request handler registered as an interface for the content management system, the bulk user setup request handler for
receiving the user registration request from the computing device,
validating the user registration request, wherein validating comprises confirming values in the role information for each user of the plurality of users and values in the attribute information for each user of the plurality of users are valid values for the content management system,
supplying, to the content management system, individual registration requests, each registration request comprising identification information, role information, and attribute information for one of the plurality of users,
transforming the user registration request for ingestion by a third-party system, wherein transforming comprises converting at least one of the role information and the attribute information to match registration parameters of the third-party system, and
supplying the transformed user information to the third-party system.

2. The system of claim 1, further comprising an integration engine for replicating registration upon one or more third-party systems of the analytics ecosystem, wherein
the bulk user setup request handler further provides the user information to the integration engine.

3. The system of claim 2, wherein the integration engine reformats the user information for compatibility with at least a first third-party system of the one or more third-party systems.

4. The system of claim 3, further comprising an integration data store comprising a mapping of user information fields to corresponding third-party system user information fields.

5. The system of claim 2, wherein the one or more third-party systems comprise a content development system.

6. The system of claim 5, wherein the bulk user setup interface is provided in part by the content development system.

7. The system of claim 2, wherein the integration engine is designed as a custom web part.

8. The system of claim 1, wherein the administrator uploads a file of user information via the bulk user setup interface.

9. The system of claim 8, wherein the file is a CSV file.

10. A method for registering new users of an analytics ecosystem, comprising:
receiving a user registration request from a remote computing device via a bulk user setup interface, the user registration request comprising, for each user of a plurality of users, identification information, role information, and attribute information;
validating, by processing circuitry, the user registration request, wherein validating comprises confirming values in the role information for each user of the plurality of users and values in the attribute information for each user of the plurality of users are valid values for a content management system;
supplying, by the processing circuitry, individual registration requests to a content management system, each registration request comprising identification information, role information, and attribute information for one of the plurality of users;
transforming, by the processing circuitry, the user registration request for ingestion by a third-party system, wherein transforming comprises converting at least one of role information and attribute information to match registration parameters of the third-party system; and
supplying, by the processing circuitry, transformed user information to the third-party system.

11. The method of claim 10, wherein validating comprises determining no duplicate users exist within the user registration request.

12. The method of claim 10, where validating comprises confirming that the role information is consistent with the attribute information.

13. The method of claim 10, further comprising confirming referential integrity of user information between the content management system and the third-party system.

14. The method of claim 13, further comprising:
identifying a referential integrity error; and
identifying a repair to correct referential integrity between the content management system and the third-party system.

15. The method of claim 14, further comprising automatically applying the repair.

16. A non-transitory computer readable medium having instructions stored thereon for registering new users of an analytics ecosystem, wherein the instructions, when executed by processing circuitry, cause the processing circuitry to:
generate a bulk user setup interface for presenting, to an administrator on a computing device, one or more controls for entering, for each user of a plurality of users of the analytics ecosystem, respective user information, the user information comprising user identification information, user attribute information, and user role information;
cause provision of the bulk user setup interface to the computing device via a network;
receive, via the network from the computing device, user information for a plurality of users, the user information comprising, for each user of the plurality of users, respective user information, the user information comprising user identification information, user attribute information, and user role information;
automatically populate the user information within a content management system;
transform the user information for ingestion by a third-party system, wherein transforming comprises converting at least one of role information and attribute information to match registration parameters of the third-party system;
supply the transformed user information to the third-party system; and
confirm referential integrity between the content management system and the third-party system.

17. The non-transitory computer readable medium of claim 16, wherein a same user identifier is used to identify a given user of the plurality of users in both the content management system and the third-party system.

18. The non-transitory computer readable medium of claim 16, wherein the bulk user setup interface presents, to a user, a plurality of valid roles and a plurality of valid attributes.

19. The non-transitory computer readable medium of claim 16, wherein the bulk user setup interface is configured to validate a registration file uploaded via the bulk user setup interface to confirm each role entry comprises a valid role value and each attribute entry comprises a valid attribute value.

20. The non-transitory computer readable medium of claim 16, wherein receiving the user information comprises receiving the user information at a custom account setup API handler of the content management system.

\* \* \* \* \*